United States Patent [19]
Doris, Jr. et al.

[11] Patent Number: 5,794,053
[45] Date of Patent: Aug. 11, 1998

[54] METHOD AND SYSTEM FOR DYNAMIC INTERFACE CONTRACT CREATION

[75] Inventors: Daniel Joseph Doris, Jr., Lebanon; Donald Joseph Solar, Livingston, both of N.J.

[73] Assignee: Bell Communications Research, Inc., Morristown, N.J.

[21] Appl. No.: 681,234

[22] Filed: Jul. 22, 1996

Related U.S. Application Data

[63] Continuation of Ser. No. 245,313, May 18, 1994, abandoned.

[51] Int. Cl.$^6$ .......................... G06F 13/00; G06F 15/163
[52] U.S. Cl. ............................. 395/712; 395/200.3
[58] Field of Search .................... 395/200.02, 712, 395/200.3

[56] References Cited

U.S. PATENT DOCUMENTS

| | | | |
|---|---|---|---|
| 5,179,703 | 1/1993 | Evans | 395/703 |
| 5,187,787 | 2/1993 | Skeen et al. | 395/680 |
| 5,283,856 | 2/1994 | Gross et al. | 395/51 |
| 5,333,252 | 7/1994 | Brewer, III et al. | 707/506 |
| 5,355,484 | 10/1994 | Record et al. | 395/704 |
| 5,416,917 | 5/1995 | Adair et al. | 395/500 |
| 5,634,114 | 5/1997 | Shipley | 395/500 |

*Primary Examiner*—Parshotam S. Lall
*Assistant Examiner*—Kenneth R. Coulter
*Attorney, Agent, or Firm*—Joseph Giordano; David A. Hey; Loria B. Yeadon

[57] ABSTRACT

A system for creating user defined software interface contracts for sending host system data to any external system. The external systems can reside on any type of hardware platform. The invocation of a contract is controlled by a set of user defined conditions known as an event. The creation of event and contracts is completely under the control of the users of the external systems with little or no support of the host system developers to establish new interfaces to the external systems.

4 Claims, 7 Drawing Sheets

FIG. 3

```
COMMAND          * WFADO: EVENT PROCESSING FACILITY *         /FOR
         44        FIELD DIRECTORY (DOEDIR)              06/07/92 08:30 CST
CMDX  56
DOMAIN\WORKREQ   OBJECT ORD —48                         51  50  52  53
************************************************************
 CMD  TAG     INTERNAL NAME—42                          OCC# LNTH TYPE OFF

U   LMOS_SUB  SUB10 —60                                 2  FDP    3
  U   CENTER    CTR                                       3  LPC   35
  U   ORDER#    JOBID                                    12  CHA   38
  U   CKLS#     #TERM                                     2  FBI   50
  U   CUSTNAME  CUSTN        +----------------------+    30  CHA   52
  U   REACH#    REACH        : The user enters the TAG names :   10  CHA   83
  U   MCO       MCO    >44   : within DOMAIN of WORKREQ and an :   3  LPC   94
  U   TIMESTMP  STAMP        : OBJECT of ORD and the "U" for  :   8  CHA   97
  U   ORDSTAT   ORDST        : update and hits the PF5 key to :   1  CHA  105
  U   CMPLDATE  COMDT        : add the TAG names to the      :    6  DAT  106
  U   CMPLYY    COMYY        : field directory.             :    2  CHA  106
  U   CMPLMM    COMMM        +----------------------+           2  CHA  108
  U   CMPLDD    COMDD                                           2  CHA  110
                COMTM                                           4  TIM  112

<BEGIN> - PF2 TO FORWARD, PF11 FOR DOEDEF
DOS006I FIND SUCCESSFUL
```

FIG. 4

```
COMMAND           * WFADO: EVENT PROCESSING FACILITY *          /FOR
            46        CONTRACT DEFINITION (DOECON)         06/07/92 08:55 CST
CMDX       (   74
DOMAIN WORKREQ  CONTRACT DUEDATE1 OBJECT ORD —48              VIEW L
***********************************************************************
TITLE COMMITMENT CONTROL FIELDS FOR INSTALLATION              SUSPEND N

ROUTING CRITERIA --> SOP Y OR SEC        CENTER N OR PATHID DUEDT001
80                                     72                         76
    CMD TAG         CMD  TAG        CMD TAG      CMD TAG      CMD TAG
         LMOS_SUB          CR01
     X   CENTER            CR02
     X   ORDER#       70   CR03
         CKLS#             RO_MAN1   +---------------------------------+
     X   CUSTNAME          RO_MAN2   : The user has entered the contract :
         REACH#        X   DUEDATE   : name, title, routing criteria and :
78       MCO         70              : 'X' selected fields to be included :
         TIMESTMP                    : in the contract. A PF4 adds the    :
     X   ORDSTAT                     : contract.                          :
     X   CMPLDATE                    +---------------------------------+
         CMPLYY
         CMPLMM
    <END>
    D0S003I ADD SUCCESSFUL
```

FIG. 5

```
COMMAND     46       * WFADO: EVENT PROCESSING FACILITY *        /FOR
                          EVENT DEFINITION (DOEEVT)         06/07/92 09:26 CST
CMDX       /    82              84
DOMAIN WORKREQ   EVENT DUED_EVT  OBJECT CKL                       SUSPEND Y
TITLE THIS EVENT IS TO IDENTIFY DALLAS INSTL COMMIT DATE CHANGES  DEFER   N
***************************** CONDITIONS **********************************

CMD  TAG        CONDITION                                         OR
        ┌JOBTYPE    = 'I***'
    86─┤ COMIT_DT   CHANGE
                                                                       90
         88
                    +------------------------------------------+
                    | The DOEEVT screen allows the user to     |
                    | create events using TAG field names.     |
                    | This event will be seen to have occurred |
                    | when the Work Request Job Type first     |
                    | character is 'I' (Installation) and the  |
                    | Commitment Date changes for any reason.  |
                    +------------------------------------------+

<END> - PF11 FOR DOEINV
DOS003I ADD SUCCESSFUL
```

FIG. 6

```
COMMAND      46      * WFADO: EVENT PROCESSING FACILITY *       /FOR
                        EVENT/CONTRACT INVOCATION (DOEINV)    06/07/92 10:30 CST
CMDX
DOMAIN WORKREQ    EVENT DUED_EVT  — 92
TITLE THIS EVENT IS TO IDENTIFY DALLAS INSTL COMMIT DATE CHANGES
************************ CONTRACTS INVOKED *****************************

CMD  CONTRACT   TITLE / ROUTING CRITERIA
 A   DUEDATE1
                    — 94
98
 A   DUEDATE2
        \
         96
```

> The System Administrator will now add the contract to be invoked (sent) when the Event has occured by using a line command of 'A' and entering the name of the Contract on the DOEINV screen. Since the event must already exist before using this screen, the PF5 key is used to update the list of contracts to be invoked.

```
<END>
DOS006I FIND SUCCESSFUL
```

METHOD AND SYSTEM FOR DYNAMIC INTERFACE CONTRACT CREATION

This application is a continuation of Ser. No. 08/245,313 filed May 18, 1994, now abandoned.

TECHNICAL FIELD OF THE INVENTION

The present invention relates to a software system for dynamically defining interface contracts for extracting data from a host system containing the data and transmitting the data to one of a plurality of external systems requesting the data.

BACKGROUND OF THE INVENTION

In order to operate today's modern telecommunications systems sophisticated operations support systems are needed to manage the vast quantities of data that are necessary for the operation of the business. The operations support systems may be provided by a plurality of vendors where data must flow from one system to another for processing. One such system is the Work Force Administration (WFA) system developed by Bell Communications Research Inc. of Livingston, N.J. The WFA system essentially creates and tracks work orders with due dates for the provisioning and repair of telecommunication services. One sub-system within the WFA system is the Work Force Administration/Dispatch Out (WFA/DO) subsystem which communicates the work order data to other systems that have a need for the data. For example, within Southwestern Bell Telephone company there is a report generating software system called the Statistical Management Analysis Report Tracking System (SMARTS) which produces many statistical reports used to measure the installation work. In order for SMARTS to complete its functions it requires specific data from WFA/DO. However, SMARTS does not and should not receive all data generated by WFA/DO. Instead, only a subset of the data as defined by specified fields is required upon the happening of a specified event. These fields and events that define the data flow from WFA/DO to SMARTS are specified in what is known in the art as an interface contract.

An interface contract is a subset of data fields that are related and that are to be transmitted from the host system to a remote system upon the occurrence of a set of conditions. In the current art, interface contracts are customized hard coded software modules that are linked to each release of the software. In other words, with each new release of host system software there may be a need to update the interface contract software because there may be new fields in the data or data fields may be renamed. Furthermore, each receiving software system also evolves with the introduction of new software releases which may require a different subset of data from the host system. Such changes necessitate changes in the interface contract software.

Additionally, the data communicated from the host to the external system is transmitted according to a syntax defined by the communications protocol between the two systems. The naming conventions for the data in both the host and receiving systems may be different and may also change.

When there is a situation with a plurality of external systems requiring data from a host system there is then a plurality of interface contract software modules that require constant maintenance and modification. Such constant maintenance and modification support is expensive, and not very flexible.

Accordingly, it is one object of the present invention to create a system for dynamically creating interface contracts that are not dependent upon host system or external system software releases so that changes in either systems' software doesn't require a programmer to rewrite the interface contract code. It is a further object of our invention to allow a user of a external system to generically define the data needed from the host and then have the system dynamically create an interface contract between the host and the user system using the users names for the data fields for requesting the information from the host.

SUMMARY OF THE INVENTION

Applicants' invention is an method and system for dynamically creating user defined contracts between a host application and a receiving application requiring host data. Applicants' event processing facility is comprised of an event table sub-system (ETS) module, event trigger (ETR) module, and event contract interface (ECI) module. The ETS subsystem module receives user supplied names for the host system data and events and stores this information in tables. The ETR monitors the host system database for change statements analyzing the change statement to see if a change occurred in all fields related to a dynamic condition. The ECI is the module that formats all messages and handles all requests for data. Simply stated, the ETR notifies the ECI when a possible condition defining an event may have occurred. The ECI then accesses the data in the ETR to verify if a user defined event has occurred and if so, it formats the data in accordance with the data requirements in the ETS tables and then sends the required data in the proper format to the external system.

BRIEF DESCRIPTION OF THE DRAWINGS

FIG. 3 illustrates a field definition screen.

FIG. 4 illustrates a contract definition screen.

FIG. 5 illustrates an event definition screen.

FIG. 6 illustrates an event/contract invocation screen.

DETAILED DESCRIPTION

Applicants' invention can be applied to any situation where there is a need to establish a gateway between a host system and a plurality of external systems requiring data from the host system. Applicants herein describe in detail their invention as implemented within Bell Communications Research's Work Force Administration (WFA) System. This embodiment of our invention is known as the Event Processing Facility (EPF) within WFA and accordingly will be referred to as EPF throughout the remainder of this specification. This description is meant to be an illustrative embodiment and not a limitation on the invention's applicability to other similar situations that would be recognized by those skilled in the art.

Figure 1:
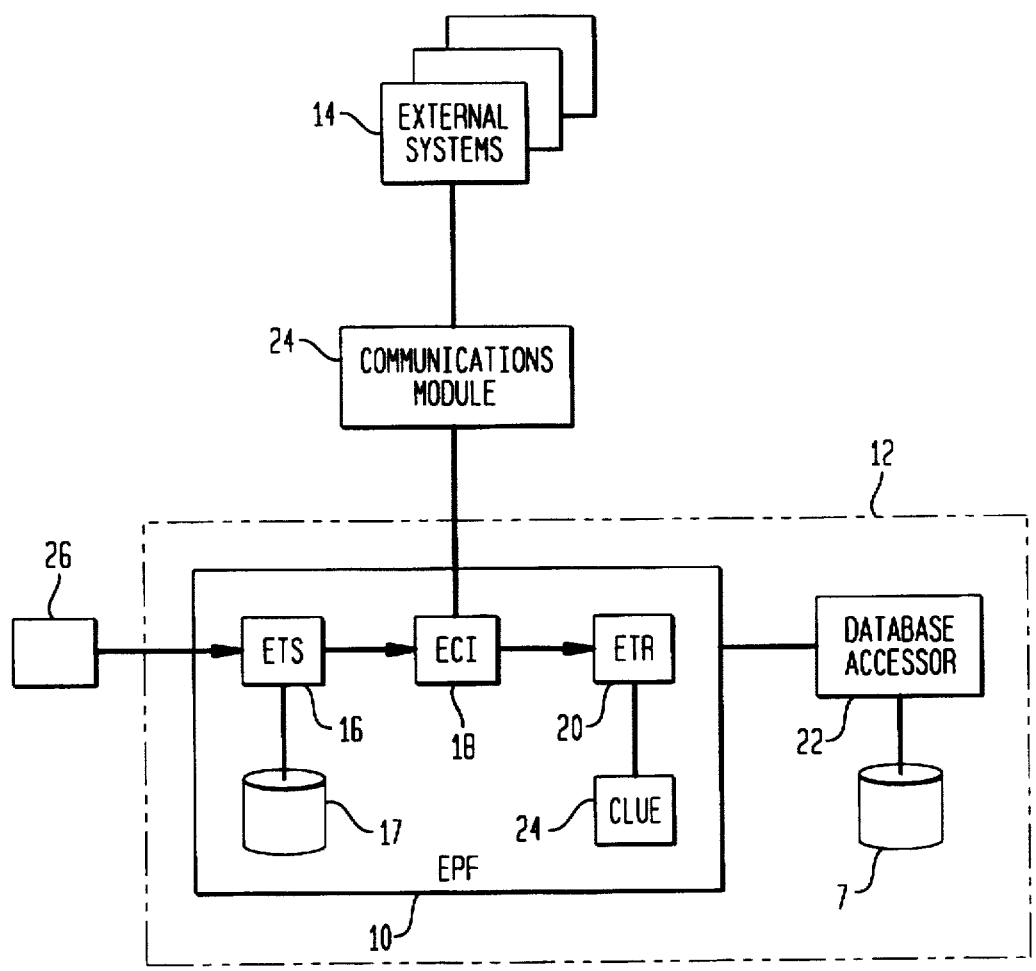
FIG. 1 illustrates the overall functional architecture of our invention.

FIG. 1 illustrates the functional architecture of our invention. The EPF 10 is a software implemented capability included within the WFA/DO system 12 where it is interposed between the database accessor 22 of WFA/DO 12 and the communications control module 24 which provides the gateway to a plurality of external operations systems 14 requiring WFA/DO data. Our invention is comprised of three main sub-systems: the event table sub-system 16, the event contract interface subsystem 18, and the event trigger sub-system 20.

The interrelationships between these subsystems can best be explained by describing an example data flow within our invention based on WFA data. In order to describe the data flow it is important to have a common understanding of the terms used. All data fields are related in some fashion into a domain. For example a WORKREQ domain defines all data fields for a work request. Within a domain, subsets of fields are related at a lower level into objects. For example, within the WORKREQ domain there is the object ORD that defines all the work order level fields within a work request. A TAG is the lowest entity in the data hierarchy; it is the name of a field within an object within a domain. For example, the tag DUEDATE is the name of a field within the ORD object further within the WORKREQ domain.

Processing of the data is contingent upon the happening of conditions which trigger events. A condition is a user defined rule which is defined in terms of values of a single tag. There are two types of conditions; static conditions and dynamic conditions. A static condition is a condition that occurs when a data field (i.e. tag) equals a specified value. A dynamic condition occurs when there are changes to a field. It is an important aspect of our invention that these conditions are specified by the users of the external systems by entering the rules into our invention via the event table sub-system 16. A set of one or more conditions within a domain defines an event. Our invention allows the user to generically define events that trigger the creating of an interface contract for communicating tag values from the host system (WFA) to the appropriate external system.

The discussion that follows will first describe the data flow and processing that occurs within our invention. Then the structure of each of the main sub-systems will be defined.

General Description of the Data Flow and Processing

The starting point for the operation of our invention is the ability of the user to associate names of a data fields used by the external system to the names of fields used internally by the host system. This is accomplished by the user entering data through the terminal 26 into the event table sub-system (ETS) 16 where the data is stored in a table within the table database 17 for the defined domain. The user would also use terminal 26 to enter event definitions into ETS 16 which would also be stored in the table database 17. The user would also use terminal 26 to enter contract definitions into ETS 16 and contract invocation rules into ETS 16 which both would be stored in tables in the table database for the each domain. Once the table have been populated by the user, our invention is ready to process data and dynamically create contracts for the external system for which the user had entered the data.

In general, our invention works as follows. The database accessor 22 monitors the host system database and communicates host system database changes to the event trigger (ETR) sub-system 20. What is communicated between the database accessor 22 and the ETR subsystem 20 is a message containing two images of the record that had changed in the database. One image would be of the record before the change the other image would be of the record after the change. The ETR sub-system 20 compares the two images within the record to the information within the "clue" module 24 looking for the occurrence of dynamic conditions. The clue module 24 is a table of only the dynamic conditions entered into the ETS system earlier. The clue module in our implementation is always loaded in resident memory to allow for fast processing. If the event trigger sub-system 20 finds that there has been changes to the fields defined in the "clue" 24 as indicating the possibility of an event, the ETR sub-system 20 sends a message containing the two record images to the event contract interface sub-system 18. The event contract interface (ECI) sub-system 18 analyzes the records received against the event definition table stored in the ETS 16. It rechecks all dynamic conditions and also checks all static conditions. If all the conditions have occurred then an event has occurred. Upon the determination that an event has occurred, the ECI sub-system 18 checks the event/contract invocation tables to see which contracts must be invoked. The ECI sub-system then retrieves all contract information that is stored in the contract definition tables within ETS 16. From the contract definition information, the ECI sub-system builds a message with the routing requirements and tag values as defined in the contract definition table and sends the contact message to the communications module 24 for forwarding to the appropriate external system 14.

What follows is a more detailed description of each sub-system.

Event Table Sub-system

Figure 2:
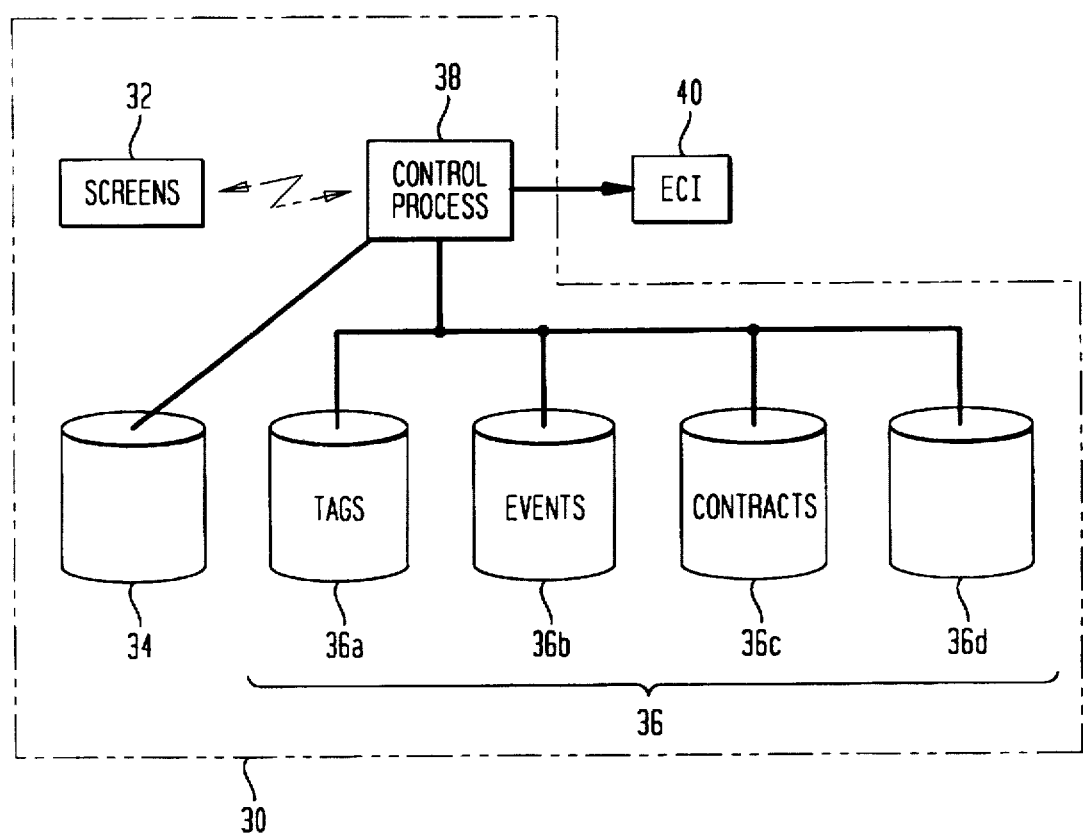
FIG. 2 depicts the functional architecture of the event tabling sub-system.

FIG. 2 depicts in more detail the event table sub-system architecture. The ETS 30 is a screen based data entry system which presents the user at terminal 32 a series of screens for entering the appropriate data. The ETS 30 is pre-loaded with a directory of internal field names 34 for the host system data. This directory of field names 34 is used for creating four main types of tables which are than stored in the database 36. The ETS 30 also acts as a gateway to the database 36 for the ECI sub-system 40. All activity in the ETS 30 is controlled by control process 38.

Using the example of the EPF, one of the first screens the user would access is depicted in FIG. 3. This is the field directory screen. Under the column marked "Internal Name" 42 are a listing of all field names 44 from the field directory (item 34 of FIG. 2) for the domain WORKREQ 46 and object ORD 48. Associated with each field are certain characteristics such as length 50 in bytes, type of field 52 (i.e. binary, character, etc.), offset 53 (which indicates the position of the field from the beginning of the record), and Occ# 51 (which is the number of occurrences of this field in the record). This information is also provided by the field directory of the host system, in this case the WFA/DO system. The user then enters, under the TAG heading 56, the names 58 the external system that are to be associated to the host field names 44. For example, the internal field name SUB1Q 60 is known as LMOS_SUB 62 by the external system in this example. The association is entered into the database by the the user entering LMOS_SUB 62 and U 64 under command 66 indicating an update to the database. When the user finishes entering all the appropriate information the information is stored in a table in the tag value database 36a. Once the user completes the field definitions for all domains and objects that the user is interested in, the user moves on to contract definition.

FIG. 4 depicts the contract definition screen used by our invention in the WFA/DO implementation. Again, for the domain WORKREQ 46 and object ORD 48 the ETS presents the TAG names 70 entered by the user in the screen shown in FIG. 3. At this point in the process the user names the contract, in this example DUEDATE1 74. The user then proceeds to define the routing criteria at locations 72 and 76. Finally, the user than selects the field (i.e. TAGs), the user would like to send to the location in the routing criteria when the DUEDATE1 contract is to be invoked. The user designates the fields by placing an X 78 next to the TAG names 70 under the CMD (command) heading 80. The user completes a contract definition for each contract the user requires to be sent to the external system from the host. These contract definitions are stored in contract definition tables 36b in the ETS database 36.

Next the user defines events that are used later in the process to invoke contracts. FIG. 5 depicts an example event definition screen from our WFA/DO implementation of our invention. This screen defines the user entitled event "DUED_EVT" 82 for domain WORKREQ and object CKL 84. The conditions shown in lines 86 and 88 are entered by the user. Line 86 shows a static condition. The static condition occurs when JOBTYPE="I***". Line 88 depicts a dynamic condition. The dynamic condition occurs whenever the COMIT_TD TAG changes. The event occurs whenever either of these conditions occur. If the user wanted the event to occur whenever both conditions happen, the user would enter an "and" instead of an "or" in location 90. Once the user defines all the appropriate events, these event definitions are stored in event definition tables 36c within database 36. Furthermore, once all the events are defined, applicants invention uses a clue generator software module (15 from FIG. 1) to read all the event tables stored in database 36 and extract all the dynamic conditions to create the CLUE module 24 which is loaded into the event trigger sub-system 20.

The final step in the set-up process is for the user to associate the user defined contracts to the user defined events. In our illustrative embodiment of our invention, this association is created by the user entering the appropriate information on a Event/Contract Invocation screen as illustrated in FIG. 6. As shown for the domain WORKREQ 46 the user associates contracts DUEDATE1 94 and DUEDATE2 96 to event DUED_EVT 92. The contracts are associated by the add command 98 entered next the contract names. Similar to the other definitions, the event contract association information is stored in database 36 in the event/contract invocation tables 36d.

The ETS database with all these user defined tables are a key feature of our invention in that it divorces the external systems data naming conventions from that of the internal host system conventions. Therefore, when the host system is updated and an internal field name is changed, host system developers only have to change the name in the field definition directory and all the interface contracts for all the internal systems will be updated and will not have to be recorded. The opposite is also true. When an external system is modified, the external system administrator can make the modifications in the tables to update the contracts without having the host system developers rewrite the interface code. These benefits are a substantial saving in time and money while providing the users with increased flexibility in using the information.

The use of the user defined tables in the operation of our inventive system is further described in the detailed descriptions of the event trigger sub-system and the event contract interface sub-system described in the sections that follow.

Event Trigger Sub-system

Figure 7:
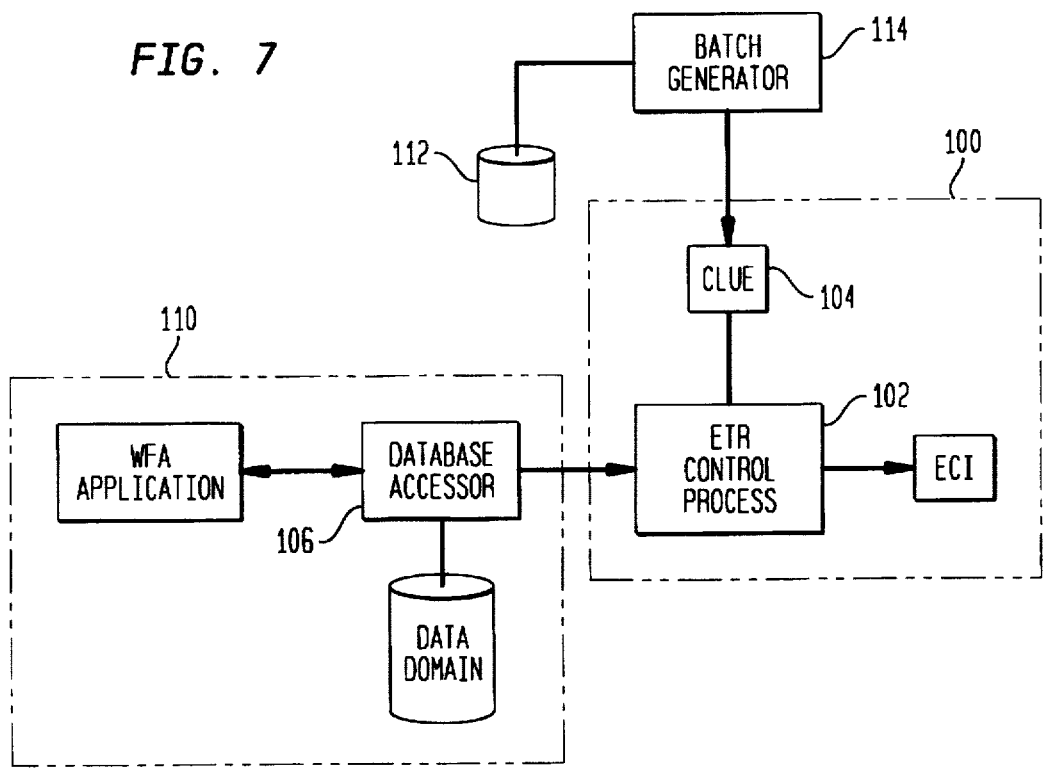
FIG. 7 depicts the location of the event trigger sub-system within the host system and its relationship with the other subsystems.

The location of the event trigger sub-system within the host system and its relationship with the other sub-systems is depicted in FIG. 7. The event trigger sub-system 100 is composed of two modules. There is an event trigger control process 102 and the clue module 104. The event trigger control process 102 accepts input from the database accessor 106 for the host system 110. The database accessor is a software process created using well known techniques in the art from basic database access calls that are contained within a computer operating system. The database accessor 106 is created to send all records in the database with add, update, or delete activity to the event trigger control process 102. The message sent to the event trigger control process 102 contains an image of the database record prior to the change and an image of the database record after the change. The event trigger control process 102 calls the clue module 104 to load a table of the dynamic conditions for the data domain indicated by the records sent from the database accessor. As we recited earlier, the clue module 104 contains tables of the dynamic conditions defined by the user and stored in the event table sub-system database 112. The clue module tables are generated by a batch process 114 and are stored in active memory for easy access by the event trigger sub-system process.

The event trigger control process 102 compares the two images sent from the database accessor and identifies what has changed using the field's offset and length information. The identified change is then compared to the dynamic conditions contained within the clue module table for the appropriate domain to see if the dynamic conditions have occurred to indicate the occurrence of a possible event.

The purpose of using the event trigger control process is to drastically reduce the number of I/O requests to the event table sub-system database. There is going to be a large number of host system database changes that do not trigger events and therefore the event trigger control process and clue module acts as a pre-processor and buffer between the host system database changes and our invention's tables of conditions and events.

When it is determined a possible event has occurred, the event trigger process will insert the two images of the record to outgoing message queue to be sent to the event contract interface sub-system 108.

Event Contract Interface Sub-system

Figure 8:
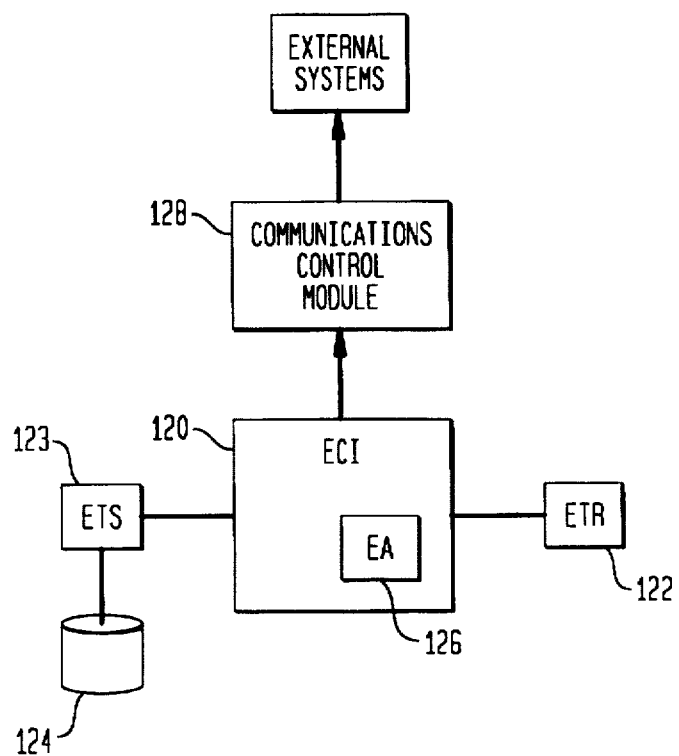
FIG. 8 depicts the location of the event contract interface sub-system and its relationship with the other subsystems.

The location of the event contract interface (ECI) sub-system within the host system and its relationship with the other sub-systems is depicted in FIG. 8. The event contract interface sub-system 120 receives messages from the event trigger sub-system 122 which contains two images of the database record where the event trigger sub-system has determined that a possible event has occurred. The event contract interface sub-system calls the ETS control processor 123 to request the condition definition tables for the appropriate domain from the ETS table database 124. The ECI sub-system 120 calls an internal event analysis process 126 to analyze the two record images received from the ETR process 122. The event analysis process 126 identifies all tags and compares the tag values to the event conditions for a true or false determination. If the conditions are true then the event is deemed to have occurred and the event analysis process passes control of the processing back to the general control process of the ECI sub-system 120. The ECI sub-system then calls the event contract invocation table from the ETS table database 124 to determine which contracts should be invoked at the occurrence of an event (see FIG. 6). Once the ECI sub-system determines which contracts are to be invoked the ECI sub-system requests from the ETS database 124 the contract definition tables (see FIG. 4). The ECI sub-system then builds a outgoing message using tag value pairs, which are well known in the art, and sends the message to a communications control module 128 for forwarding to the appropriate external system. Flexible Computer Interface Format (FCIF) is an example of message construct using tag value pairs.

In our illustrative embodiment, the user has the option of batch processing the creation and sending of the outgoing contract messages instead of conducting the processing in real time. In the deferred mode, once it is determined that an event has occurred the records are stored until the user defined time when the contracts are created and then sent.

It is to be understood that the system and method described herein are not limited to the specific forms disclosed and illustrated, but may assume other embodiments limited only by the scope of the appended claims.

We claim:

1. A system for dynamically creating an interface contract between a host software system having a host system database and an external software system, said system located within said host system and comprising:
   an event table sub-system comprising
      input means to associate external system field names to the field names of said host system as interface contract definitions, and
      to define events in terms of dynamic conditions and static conditions,
      and to associate said interface contracts to said events, and
      a definition database to store tables of said events, said field names, and said interface contracts;
   an event trigger sub-system connected to said host system database comprising
      a clue module containing user defined tags associated with said dynamic conditions, and
      means for analyzing changes in said host database to identify dynamic conditions that indicate an event has possibly occurred; and
   an event contract interface sub-system interposed between said event trigger sub-system, said event table sub-system and said external systems, wherein said event contract interface sub-system receives
      messages from said event trigger module when said event has possibly occurred
      and analyzes said messages for static and dynamic conditions to determine if said event actually occured and then
      recalls interface contract definitions from said definition database, and
      builds messages to send to said external systems based on said interface contract definitions.

2. A method for dynamically creating an interface contract between a host system and another software system, said method executed by a data processor comprising the steps of:
   creating a table of external system field names associated with host system field names;
   creating a table of dynamic and static conditions for defining events;
   creating a table associating field names that belong to an interface contract;
   creating a table associating events to interface contracts;
   receiving messages indicating changes to the host system database;
   comparing said messages to said dynamic conditions to determine if the occurrence of an event is possible;
   analyzing said messages for dynamic and static conditions if it was determined in said comparing step that an event was possible, to determine if said event actually occurred; and
   building an interface contract tag value pair message for the interface contract associated with said actual event.

3. A host computer system capable of dynamically creating interface contracts with a plurality of external systems, said host system comprising:
   a host system database containing data records;
   a host system database controller connected to said host system database;
   storage means for storing a plurality of interface contract definitions;
   means for determining the occurrence of an event, said means connected to said host system database controller wherein said host database controller sends to said means for determining, information regarding changes in said data records and said information is used by said means to determine said occurrence of an event and to select ones of said plurality of interface contract definitions should be retrieved from said storage means and invoked;
   second means, interposed between said means for determining and said host database system controller, for using said dynamic conditions for determining the likelihood of said event and only if said event is likely forwarding said information to said means for determining for further processing;
   third means, for specifying said interface contract definitions for storage in said storage means, said third means being connected to said means for determining which further comprises;
      a control process means for controlling access to said storage means;
      an input means connected to said control process means for inputting data; and
      wherein from said input data said events are defined in a first table stored in said storage means, and wherein said interface contract definitions are stored in a second table in storage means, and wherein associations between said interface contracts and said events are stored in a third table in said storage means.

4. A method for providing flexible interface contract definition between a host computer system having a database of records and external computer systems accessing said database to modify said records, said method, executed by a computer system, comprising the steps of:
   first associating the names of data fields used by said external systems to the names of data fields used by said host system and storing said associations as interface contract definitions in a storage means;
   defining a plurality of events in terms of changes to said records and storing said event definitions in said storage means, wherein said changes are categorized as static and dynamic conditions;
   second associating said event definitions to said interface contract definitions and storing said second associations in said storage means;
   comparing said changes in said records to said plurality of event definitions to determine which of said events has occurred;

identifying said interface contract definitions associated with said events that have occurred;

building outgoing messages to said external systems according to said interface contract definitions;

extracting from said storage means said dynamic conditions for defining possible events;

loading said possible event definitions based on dynamic conditions into resident memory;

preprocessing said changes to said records by comparing said changes to said dynamic conditions loaded in resident memory to determine if an event has possibly occurred and if said event has possibly occurred then preceding to said comparing step.

* * * * *